Sept. 30, 1941.   A. J. SORENSEN   2,257,310
BRAKE AND SANDING CONTROL MEANS
Filed Sept. 21, 1940   2 Sheets-Sheet 1

INVENTOR
ANDREW J. SORENSEN
BY
ATTORNEY

Patented Sept. 30, 1941

2,257,310

UNITED STATES PATENT OFFICE 2,257,310

BRAKE AND SANDING CONTROL MEANS

Andrew J. Sorensen, Edgewood, Pa., assignor to The Westinghouse Air Brake Company, Wilmerding, Pa., a corporation of Pennsylvania Application September 21, 1940, Serial No. 357,675

19 Claims. (Cl. 291—15)

This invention relates to brake and sanding control means for vehicles, such as railway cars and trains, and is in part a continuation of my prior copending application, Serial No. 318,679, filed February 13, 1940, and assigned to the same assignee as the present application.

In Patent 2,208,738 to Claude M. Hines there is disclosed a brake and sanding control equipment for railway cars and trains so constructed and arranged as to cause sanding of the rails automatically in advance of a limited number of wheels when the rate of rotative deceleration of any one of the wheels of the limited number exceeds a certain non-slipping rate, and effective when any of the wheels of the limited number rotatively decelerates at a rate in excess of a certain slipping rate to cause a rapid release of the brakes associated with the limited number of wheels to cause the slipping wheel or wheels to be restored to a speed corresponding to car speed without actual sliding thereof.

The term "slipping rate of deceleration" refers to the abnormally rapid deceleration of a vehicle wheel from a speed corresponding to vehicle speed toward a locked condition due to the application of the brakes associated with the wheel to a degree sufficient to exceed the limit of the adhesion or rolling friction between the wheel and the road surface or rail on which the wheel rolls. Normally it is possible for the wheels of railway cars to be decelerated at a rate up to four or five miles per hour per second under good rail conditions, that is where the coefficient of adhesion of the wheels to the rails is relatively high, without slipping. If the rate of rotative deceleration of the car wheel exceeds a rate such as ten miles per hour per second it is, therefore, a positive indication that the wheel is slipping.

"Slipping" or "slipping condition" of a car wheel may be generally defined as the rotation of the wheel at a speed less than a speed corresponding to car speed at a given instant. "Sliding" of a vehicle wheel may be defined generally as the dragging of a vehicle wheel along a road surface or rail in a locked condition. The two terms are thus not synonymous and the distinction therebetween should be borne in mind in the subsequent description of my invention.

It is desirable to cause automatic sanding of the rails in advance of a car wheel when it approaches the maximum rate at which it can rotatively decelerate without actually slipping for the purpose of so improving the adhesion or coefficient of adhesion between the wheel and the road surface or rail as to minimize the possibility of the wheel slipping. It is also desirable to rapidly release the brakes associated with a given wheel, if the wheel begins to slip, in order to cause the wheel to be restored to speed corresponding to vehicle speed before it can decelerate to a locked condition and slide.

It is an object of my present invention to provide a brake and sanding control equipment for a railway car or train of the type disclosed in the above Patent 2,208,738 and further characterized by a novel arrangement utilizing the automatic sanding control equipment in a manner so as to permit the sanding of the rails at will under the manual control of the operator of the vehicle.

It is another object of my invention to provide a brake and sanding control equipment for a train of cars of the type indicated in the foregoing object and further characterized by selective manual control of sanding on the power car or locomotive and the remaining cars so as to enable sanding of the rails in advance of the wheels of the power car or locomotive only, whenever it is so desired as on starting the train, to prevent racing of the driver or traction wheels.

It is another object of my invention to provide a brake and sanding control equipment for a train of cars of the type indicated in the foregoing object and further characterized by an arrangement for selectively effecting, under manual control, the sanding of the rails in advance of the wheels of only the power car or in advance of the wheels of the power car and the other cars, depending upon whether or not a brake application is in effect on the power car and other cars.

The above objects and other objects which will be made apparent hereinafter, are attained by means of an embodiment of my invention subsequently described and shown in the accompanying drawings, wherein Figs. 1 and 2 taken together in side-by-side relation represent in diagrammatic form a brake and sanding control equipment for a power car or locomotive and a drawn car respectively.

Description of equipment

Figure 1:
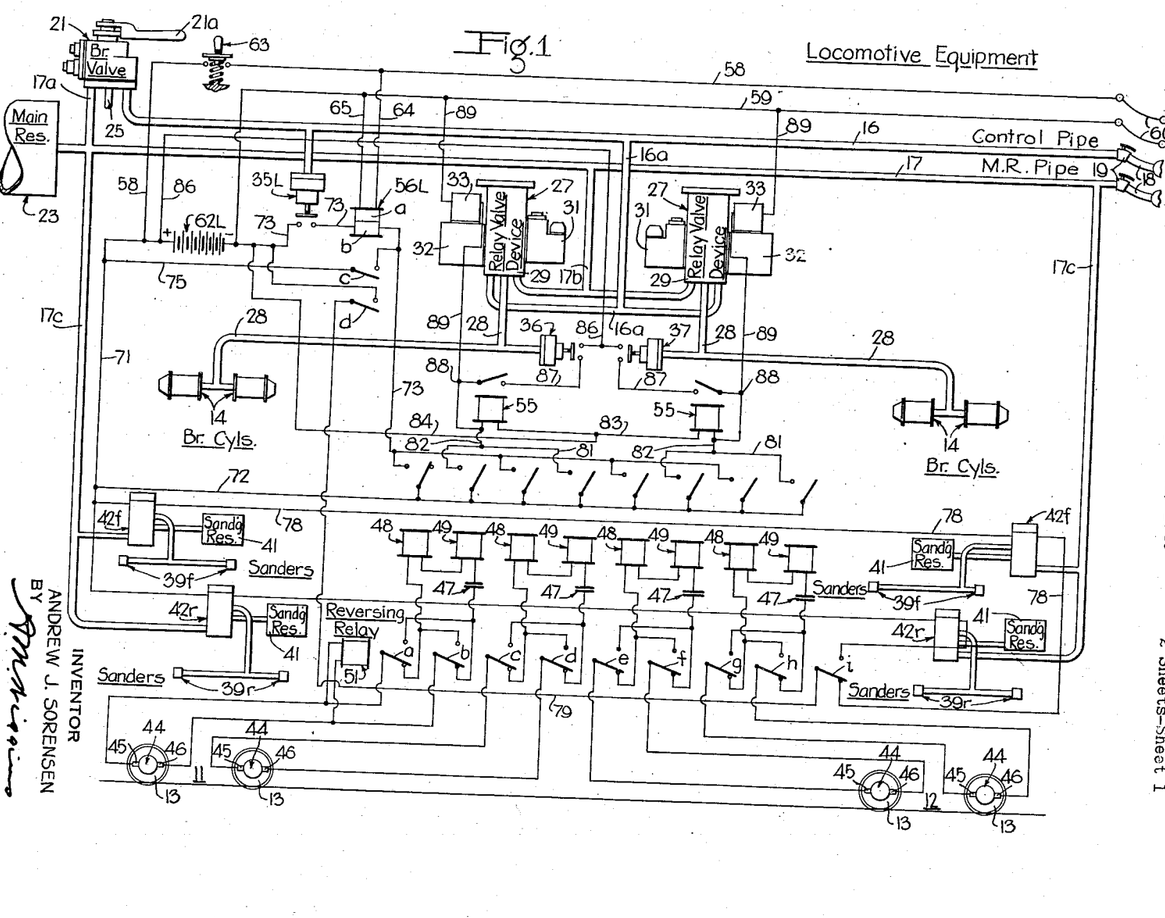
Figure 2:
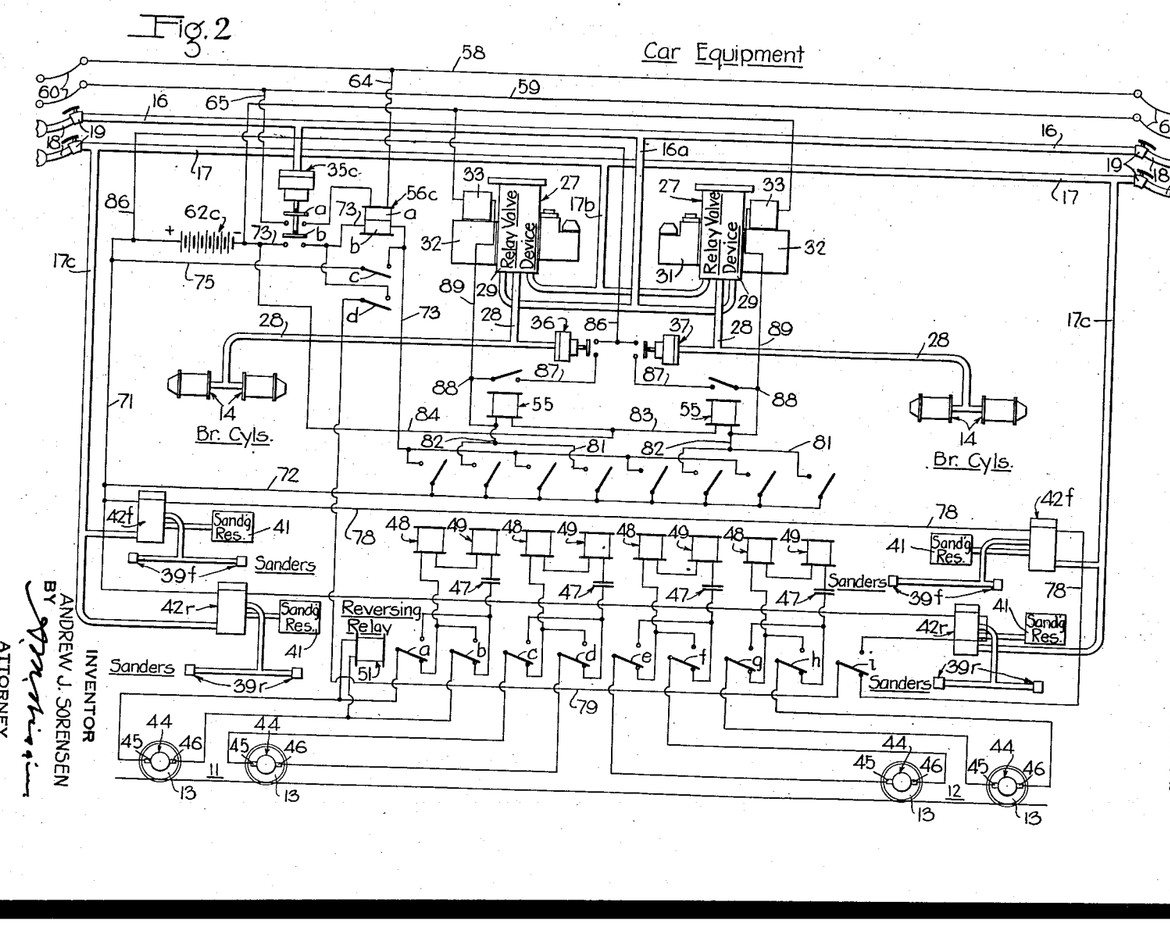

The locomotive brake and sanding control equipment shown in Fig. 1 and the car brake and sanding control equipment shown in Fig. 2 are identical to a large degree and accordingly the same reference numerals will be employed to identify the same elements on the locomotive and on the car, except where it is necessary to differentiate the elements on the locomotive from those on the car.

The locomotive may be provided with any desired number or arrangement of wheels but for purposes of the present invention, it is illustrated as provided with two four wheel trucks 11 and 12 respectively. The typical car shown in Fig. 2 is illustrated, similarly, as having two four-wheel trucks 11 and 12.

Each of the wheel trucks 11 and 12 comprises two pairs of wheels 13 (only one wheel of each pair being shown), the two wheels being fixed at opposite ends to and connected by an axle, not shown, in conventional manner.

Associated with the wheels of each of the wheel trucks 11 and 12 on the locomotive and car are fluid pressure operated brake devices including a suitable number of brake cylinders 14, illustratively shown as two per truck. While not shown, it will be understood that the brake apparatus for retarding the rotation of the wheels may be of any suitable character, such as the familiar clasp shoe type engaging the rim of the wheels and operated into and out of engagement with the rim of the wheels in response to the supply of fluid under pressure to and the release of fluid under pressure from the brake cylinders 14, respectively.

For the purposes of my present invention, fluid under pressure may be supplied to the brake cylinders 14 to effect application of the wheel brakes and released therefrom to effect the release of the wheel brakes by any suitable type of control apparatus. For simplicity, I have illustrated a simple straight-air brake system comprising two train pipes 16 and 17, the sections of which on the locomotive and on the respective cars are connected in conventional manner through suitable hose couplings 18, and suitable angle cocks 19 being provided for opening and closing the ends of the pipes as desired. The train pipe 16, hereinafter referred to as the control pipe, is normally vented and is charged with fluid under pressure by means of a manually operative brake valve 21 of the self-lapping type to correspondingly control the desired degree of application of the brakes.

The train pipe 17, hereinafter referred to as the main reservoir pipe is connected to a reservoir 23 on the locomotive hereinafter referred to as the main reservoir. The main reservoir 23 is constantly charged to a normal pressure such as one hundred pounds per square inch by a fluid compressor not shown, and the main reservoir pipe 17 is thus charged to a corresponding pressure.

The brake valve 21 is so well-known that a mere functional description thereof will suffice for the purposes of the present application. The brake valve 21 comprises a self-lapping valve mechanism having a rotary operating shaft on which a brake valve handle 21a is fixed for effecting rotary movement of the operating shaft. With the brake valve handle 21a in its normal brake release position, the self-lapping valve mechanism of the brake valve is conditioned to exhaust fluid under pressure from the control pipe 16 through an exhaust port and pipe 25 at the brake valve. When the brake valve handle 21a is shifted in a horizontal plane out of its normal brake release position into a so-called application zone, fluid under pressure is supplied from a branch pipe 17a of the main reservoir pipe 17 to the control pipe 16, the pressure established in the control pipe being substantially proportional to the degree of displacement of the brake valve handle out of its brake release position.

If the pressure in the control pipe 16 tends to reduce for some reason, such as leakage, from that corresponding to the position of the brake valve handle, the self-lapping valve mechanism of the brake valve is automatically operative to continue to supply fluid under pressure from the main reservoir 23 and main reservoir pipe 17, as necessary, to maintain a pressure in the control pipe 16 corresponding to the position of the brake valve handle.

The fluid supplied to charge the control pipe 16 flows through branch pipes 16a of the control pipe to relay valve devices 27, each of which is operative, in turn, to supply fluid under pressure from a branch pipe 17b of the main reservoir pipe to a pipe 28 leading to the brake cylinders 14 of a corresponding wheel truck. In the case of the locomotive equipment shown in Fig. 1, two relay valve devices 27 are provided, one for the wheel truck 11 and one for the wheel truck 12. In a similar manner, the car equipment includes two relay valve devices 27, one for the car wheel truck 11 and one for the car wheel truck 12.

The relay valve devices 27 are of well-known construction and are thus shown only in outline form and will be only briefly described. Each relay valve device comprises a sectionalized casing wherein a central or pipe bracket section 29 has affixed to opposite faces thereof a relay valve section 31 and a magnet valve section 32.

The relay valve section 31 embodies a supersensitive high capacity self-lapping relay valve mechanism having an operating piston or diaphragm on one side of which is an operating chamber to which fluid under pressure is supplied from the branch pipe 16a of the control pipe. The relay valve section 31 is operative in response to the pressure established in the control pipe 16 and supplied to the operating chamber thereof to supply fluid under pressure from the corresponding branch pipe 17b of the main reservoir pipe to the brake cylinder pipe 28, the pressure established in the brake cylinders 14 having any desired relation, such as a one-to-one ratio, to the pressure in the control pipe.

The magnet valve section 32 comprises a double-beat magnet operated valve including an electromagnet or magnet winding 33. When the magnet winding 33 is deenergized, the magnet valve section 32 establishes communication through which fluid under pressure is supplied from the branch pipe 16a to the operating chamber of the relay valve section 31. When the magnet winding 33 is energized, however, the supply communication is closed and a venting communication established through which fluid under pressure is exhausted from the operating chamber of the relay valve section 31 at a rapid rate. The relay valve section 31 thus operates in response to energization of the magnet winding 33 to effect a rapid reduction of the pressure in the brake cylinders 14 controlled thereby. The manner in which the magnet windings 33 of the several relay valve devices 27 are energized and deenergized will be explained hereinafter.

The locomotive equipment shown in Fig. 1 further comprises three fluid pressure operated switch devices 35L, 36 and 37 and the car equipment shown in Fig. 2 includes three similar fluid pressure operated switch devices 35C, 36 and 37, all hereinafter conveniently referred to as pressure switches.

The pressure switches on the locomotive and on the cars may be of any suitable snap-acting type in which the contact members are actuated from their open to their closed positions in response to an increase of fluid pressure supplied thereto above a certain pressure and conversely restored to their open positions in response to a decrease of fluid under pressure supplied thereto below such certain pressure. The critical operating pressure at which the contact members of the pressure switches operate from one position to the other may be selected or adjusted as desired. The pressure switch 35L on the locomotive and the pressure switch 35C on each of the cars are so set as to have the contact members thereof snap-actuated to their closed position in response to an increase of the pressure in the control pipe above five pounds per square inch and restored by snap-action to their open position in response to a decrease in pressure in the control pipe below such pressure. In a similar manner, the pressure switches 36 and 37 on the locomotive and cars are so set that the contact members thereof are snapped into the closed position thereof upon an increase of the pressure in the corresponding brake cylinders above five pounds per square inch and snapped back to the open position thereof upon a reduction of the pressure in the corresponding brake cylinders below such pressure.

The pressure switch 35C on the cars, it will be noted, differs from the pressure switch 35L on the locomotive in having two insulated contact members $a$ and $b$ respectively whereas the pressure switch 35L on the locomotive has but a single contact member.

The purpose and function of the pressure switches on the locomotives and cars will be made apparent hereinafter.

The locomotive and car equipment further includes sanding control equipment and apparatus including a pair of fluid pressure operated sanding devices 39f and a similar pair of sanding devices 39r for each wheel truck 11 and 12. As indicated diagrammatically by the relative location of the sanding devices on opposite sides of each wheel, the sanding devices 39f are effective to cause sanding in advance of the wheels while rotating in one direction and the sanding devices 39r are effective to cause sanding in advance of the wheels when the wheels are rotating in the opposite direction. It will be assumed that the sanding devices 39f are operative when the wheels are rotating in a direction corresponding to the forward travel of the locomotive and cars and, conversely, that the sanding devices 39r are operative when the locomotive and cars are traveling in a reverse direction.

Although indicated in block or outline form, it will be understood that the sanding devices 39f and 39r are of conventional construction and effective to cause deposition of the sand in advance of the wheels from a suitable reservoir, not shown, upon the supply of fluid under pressure to the sanding devices and that upon a cessation of the supply of fluid under pressure thereto, sanding is stopped.

Associated with each pair of sanding devices 39f and 39r are a sanding reservoir 41 and a sanding magnet valve 42f or 42r.

The sanding magnet valves 42f and 42r are double beat magnet valves of well-known construction including an electromagnet winding effective when energized to operate the double beat valve from one position to another position. With the electromagnet winding of the sanding magnet valves 42f and 42r deenergized, communication is established from a branch pipe 17c of the main reservoir pipe 17 to the corresponding sanding reservoir 41 to charge it to the pressure in the main reservoir pipe. Upon energization of the electromagnet winding of any of the sanding magnet valves 42f and 42r, the reservoir-charging communication is closed and another communication is established through which fluid under pressure is supplied from the sanding reservoir to the corresponding sanding devices 39f or 39r.

The sanding reservoirs 41 may have any desired volume or capacity but I prefer to limit the volume of the reservoirs 41 so that the normal pressure therein, corresponding to the pressure in the main reservoir pipe 17, is reduced to a very low pressure in a given interval of time such as ten to fifteen seconds by exhaust through the sanding devices to which it may be connected. Accordingly, although the electromagnet winding of the sanding magnet valves 42f and 42r may remain energized, operation of the sanding devices 39f and 39r to effect sanding is automatically stopped in a predetermined limited time.

The manner in which the sanding magnet valves 42f and 42r on the locomotive and cars are controlled will be explained hereinafter.

The equipment further comprises apparatus responsive to the rate of rotative deceleration of the individual wheel units on the locomotive and cars effective, in part, to control the operation of the sanding apparatus and, in part, to control the operation of the relay valve devices 27 corresponding thereto.

This electrical apparatus is the same on the locomotive and on the cars and consequently a description of the locomotive equipment will also describe the car equipment. As diagrammatically shown, the electrical apparatus comprises a magneto or direct-current generator 44 for each axle or pair of connected wheels, each generator being arranged to be driven by rotation of the corresponding axle so as to produce a voltage which is substantially proportional to the speed of rotation of the axle and the wheels fixed thereto. The generators 44 may be so mounted in the journal housings at one end of the axle that the rotary armature shaft of the generator may be coupled in coaxial relation to the end of the axle or any other suitable arrangement may be employed.

Connected in series-circuit relation across the brush terminals 45 and 46 of each generator 44 are an electrical condenser 47 and two current-responsive relays 48 and 49, hereinafter respectively referred to as the sand relay and the brake relay.

The connections of each set of relays 48 and 49 and the associated condenser 47 to the brush terminals of the corresponding generator 44 are reversed automatically upon a reversal of direction of rotation of the vehicle wheels 13 by means of a reversing relay 51. The reversing relay 51 is a conventional polarized relay having its operating winding connected across the brush terminals 45 and 46 of one of the generators 44 on the locomotive or car. When the locomotive or car is traveling in a forward direction, the polarity of the brush terminals 45 and 46 of the generators 44 is such as to cause the contact members $a$, $b$, $c$, $d$, $e$, $f$, $g$, $h$, and $i$, of the reversing relay 51 to be biased to a normal position in which they are shown.

Upon the reversal of the polarity at the brush terminals of the corresponding generators 44 in response to a reversal of rotation of the wheels with a reverse travel of the locomotive and cars, the contact members a to i of the reversing relay 51 are actuated from the normal position to the opposite position thereof. As will be readily understood, a corresponding pair of contact members of the reversing relay 51 are effective to reverse the connections of the corresponding relays 48 and 49 and condenser 47 to the brush terminals of the corresponding generator. The ultimate purpose of reversing connections as effected by the reversing relay 51 will be made apparent presently.

As a preliminary to explaining the operation of the electrical apparatus, let it be assumed that the contact members of the reversing relay 51 are in the position shown corresponding to the forward travel of the locomotive or car and that the locomotive or car is accelerating under power. Due to the increasing voltage at the brush terminals of each generator 44, a charging current is supplied to the condenser 47 in the corresponding circuit which charging current flows in a certain direction through the operating windings of the corresponding sand relay 48 and brake relay 49. The sand relay 48 and brake relay 49 are so-called uni-directional relays in which the flow of current through the operating winding thereof in one certain direction only is effective to cause pick-up of the relay, that is the operation of the single contact member thereof from the normal or open position to an operated or closed position whenever and as long as the current in such one direction exceeds a certain value. If the current flowing in the one certain direction through the operating windings of the relays 48 and 49 reduces below a certain value or if the current flows through the operating windings of the relays in a direction opposite to the one certain direction, the contact member of the relays is restored to its normal open position or maintained therein as the case might be.

The operating windings of the sand relay 48 and the brake relay 49 are so connected in each generator circuit that the direction of flow of the condenser charging current in the circuit is in a direction opposite to the one certain direction required to cause pick-up of the contact member. Thus, upon acceleration of the locomotive or car, the contact member of each of the relays 48 and 49 is maintained in its normal open position, as shown.

Upon deceleration of the locomotive or car, the voltage at the brush terminals of the generators 44 decreases at a corresponding rate. Current is accordingly discharged in the circuit from the condenser 47 in a reverse direction to the charging current, the degree of current being proportional to the rate of reduction of the generator voltage, which is proportional to the rate of deceleration of the corresponding wheels.

The sand relay 48 and the brake relay 49 are not picked-up at the same time but are so designed that the contact member of the sand relay member 48 is actuated from its normal open position to its closed position in response to a condenser discharge current exceeding a certain value corresponding to a rate of rotative deceleration of the corresponding vehicle wheels of for example four miles per hour per second, whereas the contact member of the brake relay 49 is not actuated from its open to its closed position unless the condenser discharge current flowing through the operating winding thereof exceeds a value corresponding to a rate of rotative deceleration of the same vehicle wheel of ten miles per hour per second.

As previously indicated, the contact member of each of the relays 48 and 49 is restored to the normal or open position thereof when the current in the one certain direction reduces below the pick-up value. Thus, when the rate of rotative deceleration of the corresponding vehicle wheel reduces below ten miles per hour per second, the contact member of each brake relay 49 is restored to its open position; and when the rate of rotative deceleration of a vehicle wheel is reduced below four miles per hour per second, the contact member of each sand relay 48 is restored to its open position.

It will be apparent that upon a reversal of direction of rotation of a vehicle wheel and the consequent reversal of the polarity at the brush terminals of the generators 44, the direction of flow of the condenser charging and condenser discharging current is reversed. In order to maintain the direction of flow of condenser charging and discharging current the same regardless of the direction of rotation of the vehicle wheels, the reversing relay 51 is provided for reversing the connections to the brush terminals of the generator in the manner previously described. Thus the sand and brake relays 48 and 49 are operated in the same manner whether the locomotive or car is traveling in a forward or a reverse direction.

It will be understood that this type of electrical apparatus sensitive to the rate of change of rotative speed of a vehicle wheel is in itself not my invention.

The contact members of the two brake relays 49 for each wheel truck are connected in parallel relation so that upon the operation of either of the relays to picked-up or closed position, another relay 55 of the neutral type, hereinafter called the brake release relay, is picked-up. Each brake release relay 55 is effective when the single contact member thereof is actuated to its picked-up or closed position to establish a self-holding circuit for itself, hereinafter to be described, and at the same time establish a circuit for energizing the electromagnet winding 33 of the magnet valve section 32 of the relay valve device 27 of the corresponding wheel truck.

According to my invention, there is provided additionally on the locomotive a master sanding relay 56L and on each of the cars a master sanding relay 56C. The master sanding relays 56L and 56C are similar in construction and each comprises a pair of separate operating windings a and b respectively, and two front contact members c and d respectively. Upon energization of either the winding a or the winding b thereof, the contact members c and d of each relay 56L and 56C are actuated from a dropped-out or open position to the picked-up or closed position thereof.

For the purpose of effecting energization of the operating winding a of the master sanding relays 56L and 56C, there is provided a pair of train wires 58 and 59, the sections of which on the locomotive and on the different cars are connected by suitable flexible couplers or connectors 60, in well-known manner. The train wires 58 and 59 are connected respectively to opposite terminals of a suitable source of direct-current, such as a storage battery 62L located on the locomotive. A manually operable switch 63 located in the control cab of the locomotive is interposed in the train wire 58. Switch 63 may be of any suitable type but, as shown diagrammatically, it is of the push-button type having a movable contact biased normally by a spring to open position and actuated to and maintained in a closed position in response to and so long as manual pressure is applied.

The operating winding $a$ of the master sanding relay 56L on the locomotive is connected by a pair of branch wires 64 and 65 to the train wires 58 and 59 respectively. Thus, whenever the switch 63 is operated to its closed position, the winding $a$ of the relay 56L is energized and remains energized as long as switch 63 remains closed. When switch 63 is opened the winding $a$ of relay 56L is deenergized.

The operating winding $a$ of the master sanding relay 56C on the cars is connected across the train wires 58 and 59 in a similar manner by branch wires 64 and 65 but the wire 65 has interposed therein the switch contact $a$ of the pressure switch 35C on the corresponding car. It will thus be seen that unless the contact $a$ of the pressure switch 35C is in its closed position, the operation of the switch 63 on the locomotive to its closed position cannot effect energization of the operating winding $a$ of the master sanding relay 56C on the cars.

On the locomotive, the contact members of all of the sand relays 48 are connected in parallel relation so that the pick-up of any of the sand relays may effect energization of the operating winding $b$ of the master sanding relay 56L if the pressure switch 35L is in its closed position. The manner in which this is accomplished will be explained in greater detail hereinafter.

In a similar manner, the contact members of all the sand relays 48 on a car are connected in parallel relation so that the pick-up of any of the relays is effective to cause energization of the operating winding $b$ of the master sanding relay 56C on the corresponding car if the contact $b$ of the pressure switch 35C on that car is in its closed position. The manner in which this is accomplished will be explained in greater detail hereinafter.

The contact member $c$ of each of the master sanding relays 56L or 56C is a self-holding contact effective to establish a self-holding circuit for the operating winding $b$ of the relay subject to the corresponding pressure switch 35L or 35C being in its closed position.

The contact member $d$ of the master sanding relays 56L and 56C is effective in its picked-up position to establish a circuit for energizing the electromagnet winding of the sanding magnet valves 42f or 42r on the corresponding locomotive or car depending upon the position of the contact member $i$ of the reversing relay 51. The manner in which this is accomplished will be explained hereinafter.

Operation of equipment

Let it be assumed that the main reservoir 23 on the locomotive is charged to the normal pressure carried therein, such as one hundred pounds per square inch, and that the main reservoir pipe 17 and the various sanding reservoirs 41 on the locomotive and cars are charged to a corresponding pressure. Let it be further assumed that the train is traveling in a forward direction, assumed to be the left-hand direction in the drawings, under power or coasting, with the brake valve handle 21a in its brake release position so that the brakes on the train are released.

Let it now be supposed that the operator desires to bring the train to a stop. To do so he first shuts off the propulsion power, if the power is on, and then operates the brake valve handle 21a out of its release position into the application zone thereof an amount corresponding to the desired degree of application of the brakes. Control pipe 16 is accordingly charged to a pressure corresponding to the application position of the brake valve handle, for example fifty pounds per square inch. Each of the relay valve devices 27 is accordingly operated, in response to the pressure supplied to the operating chamber of the relay valve section 31 thereof, to cause fluid under pressure to be supplied to the corresponding brake cylinders 14, the pressure established in the brake cylinders being equivalent or proportional to that established in the control pipe 16. The brakes are accordingly applied to the wheels on the locomotive and cars in accordance with the fluid pressure established in the brake cylinders 14.

The operator may vary the degree of application of the brakes as desired by shifting the brake valve handle 21a to different positions in the application zone thereof to correspondingly vary the pressure in the control pipe and therefore in the brake cylinders 14.

As long as the rate of rotative deceleration of the wheels on the locomotive or cars during an application of the brakes does not exceed four miles per hour per second, that is a rate sufficient to cause pick-up of any of the sand relays 48, no further operation of the equipment occurs unless in response to operation of the brake valve 21. If, however, the brakes are applied to a sufficient degree to cause all of the wheels on the locomotive and on the cars to rotatively decelerate in unison at a rate in excess of four miles per hour per second, the sand relays 48 in each of the several generator circuits are substantially simultaneously picked-up.

Upon the pick-up of the sand relays 48 on the locomotive, a circuit is established for energizing the operating winding $b$ of the master sanding relay 56L on the locomotive. In a similar manner, the pick-up of the sand relays 48 on a car is effective to establish a circuit for energizing the operating winding $b$ of the master sanding relay 56C on the corresponding car.

Referring to Fig. 1, the circuit for energizing the operating winding $b$ of the master sanding relay 56L on the locomotive extends from the positive terminal of the battery 62L by way of a wire 71, a branch wire 72, in parallel through one or more of the contact members of the sand relays 48 on the locomotive, and a wire 73 including the operating winding $b$ of the master sanding relay 56L and the contacts of the pressure switch 35L to the negative terminal of the battery 62L.

Referring to Fig. 2, the circuit for energizing the operating winding $b$ of the master sanding relay 56C on the cars extends from the positive terminal of a car battery 62C, corresponding to locomotive battery 62L, by way of a wire 71, a branch wire 72, in parallel through one or more of the contact members of the several sanding relays 48 on the car, and a wire 73 including the operating winding $b$ of the master sanding relay 56C and contact $b$ of the pressure switch 35C to the negative terminal of the battery 62C.

The contacts c and d of the master sanding relays 56L and 56C are accordingly actuated to their picked-up or closed positions.

The contact c of each master sanding relay is effective to establish a self-holding circuit for the operating winding b of the corresponding relay. In the case of the master sanding relay 56L on the locomotive, this self-holding circuit extends from the positive terminal of the battery 62L by way of the wire 71, a branch wire 75 including front contact c of relay 56L, wire 73 including the operating winding b of relay 56L and the contact of the pressure switch 35L to the negative terminal of the battery 62L.

In the case of the master sanding relay 56C on the cars, the self-holding circuit extends from the positive terminal of the battery 62C on the corresponding car by way of the wire 71, branch wire 75, including the front contact c of the relay 56C, and wire 73 including the operating winding b of the relay 56C and the contact member b of the pressure switch 35C to the negative terminal of the battery 62C.

Accordingly, once the operating winding b of either the relay 56L on the locomotive or the relay 56C on the cars is energized, a self-holding circuit is established for maintaining it energized thereafter until the pressure switch 35L or 35C is restored to its open position.

The front contact member d of each of the master sanding relays 56L and 56C is effective to establish a circuit for energizing the electromagnet winding of the sanding magnet valves 42f on the lomocotive and cars respectively. In the case of the locomotive, the circuit extends from the positive terminal of the locomotive battery 62L by way of the wire 71, a branch wire 78 including in series relation therein the electromagnet windings of the two sanding magnet valves 42f on the locomotive, contact member i of the reversing relay 51, a wire 79 including contact d of relay 56L, and thence by the wire 73 to the negative terminal of the battery 62L.

In a similar manner, the contact d of the master sanding relay 56C on each car is effective in its closed position to establish a circuit for energizing the electromagnet winding of the sanding magnet valves 42f on the corresponding car. This circuit extends (see Fig. 2) from positive terminal of the car battery 62C by way of the wire 71, a branch wire 78 including in series relation therein the electromagnet windings of the two sanding magnet valves 42f on the car, contact member i of the reversing relay 51 on the car, a wire 79 including contact d of the relay 56C to the wire 73, and thence by way of the wire 73 including the contact b of the pressure switch 35C to the negative terminal of the car battery 62C.

Due to the simultaneous energization of all of the sanding magnet valves 42f on the locomotive and cars, fluid under pressure is supplied from the corresponding sanding reservoirs 41 to effect operation of the forward direction sanding devices 39f which accordingly effect the deposition of sand in advance of the wheels on the locomotive and on the cars.

As long as the pressure switches 35L and 35C remain in closed position, which they will as long as the pressure in the control pipe exceeds a pressure of five pounds per square inch, the sanding relays 56L and 56C will remain picked-up so that the electromagnet windings of the sanding magnet valves 42f will remain correspondingly energized. If the brakes remain applied longer than a time such as ten seconds, however, the pressure in the sanding reservoirs 41 will have blown down through the sanding devices 39f so that the sanding devices will not operate thereafter to cause sand to be deposited. It will thus be seen that sanding is automatically terminated in a predetermined time, to prevent the accumulation of sand on the rails after the train comes to a stop and before the brakes are released.

If the brakes are released and the pressure switches 35L and 35C restored to their open positions before the expiration of the predetermined time required to cause blow-down of the pressure in the sanding reservoirs 41, the self-holding circuit for the operating winding b of the master sanding relays 56L and 56C is interrupted and the relay contacts restored to their open positions. On the locomotive, the circuit for energizing the electromagnet windings of the sanding magnet valves 42f is consequently interrupted due to the restoration of the contact member d of the master sanding relay 56L to its open position. On the cars, the opening of contact b of pressure switch 35C interrupts the circuit for energizing the magnet windings of the sanding magnet valves 42 on the cars without waiting for contact d of sanding relay 56C to open.

Sanding is thus terminated at any time in response to release of the brakes due to the fact that the sanding magnet valves 42f are each restored to the normal position thereof establishing the charging communication for the sanding reservoirs 41 and cutting off the supply communication from the sanding reservoirs to the sanding devices 39f.

Summarizing, it will be seen that when all of the wheels of the locomotive and cars are rotatively decelerated in unison at a rate exceeding four miles per hour per second, sanding in advance of the wheels on the lomocotive and cars is effected automatically for the purpose of so improving the coefficient of adhesion or rolling friction between the wheels and the road surface or rails as to tend to prevent slipping of the wheels.

If, notwithstanding the sanding of the rails in the manner just described, the degree of application of the brakes is such as to cause a pair of wheels on the locomotive or on the car to begin to slip, a further operation occurs which will now be described. This operation is identical on the locomotive and on the cars and consequently a description of the operation on the locomotive only will be given.

Referring to Fig. 1 let it be assumed that the righthand pair of wheels (only one of which is shown) of the wheel truck 12 on the locomotive begin to slip and therefore rotatively decelerate at a rate exceeding ten miles per hour per second while the train as a whole is decelerating at a rate less than four miles per hour per second.

Due to the fact that the train is decelerating at a rate less than four miles per hour per second, none of the wheels except the slipping wheels are effective to cause sanding. However, the rotative deceleration of the slipping wheels at a rate exceeding four miles per hour per second causes pick-up of the corresponding sand relay 48. This in turn, causes energization of the operating winding b of the master sanding relay 56L just as in the case previously described where all of the vehicle wheels decelerated in unison at a rate in excess of four miles per hour per second.

Sanding of the rails in advance of all of the wheels on the locomotive is accordingly effected whenever any wheel or wheels on the locomotive exceeds a rotative deceleration rate of four miles per hour per second.

In view of the fact that a slipping wheel attains a rate of rotative deceleration exceeding ten miles per hour per second in a fraction of a second, it will be apparent that the sanding of the rails and the operation about to be described take place in very rapid sequential relation. Upon the slipping wheels exceeding a rate of rotative deceleration of ten miles per hour per second, the corresponding brake relay 49 is picked-up, that is the contact member thereof is actuated to a closed position to establish a circuit for energizing the operating winding of the corresponding brake release relay 55 for the wheel truck 12 on the locomotive.

The circuit for energizing the operating winding of the just-mentioned brake release relay 55 extends from the positive terminal of the locomotive battery 62L by way of the wire 71, branch wire 72, the contact member of the brake relay 49 corresponding to the slipping wheels, a wire 81, a branch wire 82 including the winding of the relay 55 for the wheel truck 12 of the locomotive, wires 83 and 84, and wire 73 back to the negative terminal of the battery 62L.

The single front contact of the brake release relay 55 is effective when actuated to its picked-up or closed position to establish a self-holding circuit for the operating winding of the relay and at the same time establish a circuit for energizing the electromagnet winding 33 of the magnet valve section 32 of the relay valve device 27 corresponding to the wheel truck 12 of the locomotive. This circuit extends from the positive terminal of the locomotive battery 62L by way of the wire 71, a branch wire 86, pressure switch 37 associated with the brake cylinders 14 corresponding to the wheel truck 12 of the locomotive, a wire 87 including the front contact of the corresponding brake release relay 55 to a point 88 where the circuit divides into two parallel branches, the one branch extending by way of a wire 89 including the electromagnet winding of the magnet valve 33 of the magnet valve section 32 and back to the negative terminal of the battery 62L as by way of the train wire 59 and the other branch extending by way of the wire 89, wire 82 including the operating winding of the brake release relay 55, wires 83, 84 and 73 back to the negative terminal of the battery 62L.

Thus, once the brake release relay 55 is actuated to its picked-up position, it is thereafter maintained, picked-up independently of the brake relay 49 which caused it to pick-up until such time as the pressure switch 37 is restored to its open position as hereinafter described.

Upon the energization of the electromagnet winding 33 of the relay valve device 27, the communication between the control pipe 16 and the operating chamber of the relay valve section 31 of the relay valve device 27 is closed and a communication is established through which fluid under pressure is rapidly exhausted therefrom to atmosphere. The relay valve section 31 accordingly operates to vent fluid under pressure at a rapid rate from the brake cylinders 14 associated with the wheel truck 12 of the locomotive.

Due to the instantaneous and rapid reduction in the pressure in the brake cylinders 14 associated with the wheel truck having the slipping wheels, the slipping wheels cease promptly to decelerate and begin to accelerate back toward a speed corresponding to the speed of the locomotive. The time required for the slipping wheels to return to a speed corresponding to the speed of the locomotive is ordinarily less than the time required to reduce the pressure in the brake cylinders 14 to below five pounds per square inch sufficient to cause opening of the pressure switch 37. Accordingly, the reduction of the pressure in the brake cylinders 14 for the wheel truck having a slipping wheel continues until such time as the pressure in the brake cylinders for that truck is reduced below five pounds per square inch, thereby insuring the restoration of the slipping wheels to a speed corresponding to the speed of the locomotive and at the same time delaying the reapplication of the brakes on the slipping wheels until after the slipping wheels have been restored to a speed corresponding to locomotive speed.

Upon the opening of the pressure switch 37 due to the reduction of the pressure in the brake cylinders 14 of the wheel truck 12 of the locomotive below five pounds per square inch, the self-holding circuit for the brake release relay 55 is interrupted and, at the same time, the electro-magnet winding 33 of the corresponding relay valve device 27 is deenergized. The exhaust communication for the operating chamber of the relay valve section 31 of the relay valve device 27 is accordingly closed and the supply communication thereto from the control pipe 16 reestablished.

Upon the resupply of fluid under pressure in the operating chamber of the relay valve section 31 from control pipe 16, it operates to resupply fluid under pressure to the brake cylinders 14 for the wheel truck 12 of the locomotive to effect the reapplication of the brakes thereon.

Due to the pressure maintaining feature of the brake valve 21, the pressure in the control pipe 16 is maintained despite the supply of fluid under pressure to the operating chamber of the relay valve section 31, as just described. Accordingly, the pressure reestablished in the brake cylinders 14 for the wheel truck 12 of the locomotive having the slipping wheels corresponds to the pressure established in the control pipe 16. If the wheels again begin to slip, due to the reapplication of the brakes thereon, the above operation is repeated except that the operation of the sand relay 48 is without effect, since the master sanding relay 56L established its own self-holding circuit once it picked-up. Thus, as previously described, the sanding continues for a predetermined time, once it is initiated, unless the brakes are sooner released.

When the locomotive and cars came to a complete stop in response to the application of the brakes, the brakes remain applied on all of the wheels of the locomotive and cars to a degree corresponding to the pressure remaining in the brake cylinders. In view of the fact that the relay valve devices 27 are always restored to the normal position thereof following slipping of associated wheels, it will be seen that fluid pressure is always reestablished in all brake cylinders so that all brakes associated with all wheels are effective when the locomotive and cars are stopped.

Due to the fact that the sanding reservoirs 41 blow down in a predetermined time, as previously explained, which time is ordinarily shorter than the time required to bring the train to a stop from an average high speed, the sanding of the rails will ordinarily terminate prior to the complete stopping of the train. In any case, however, sanding is terminated after a certain interval of time so that no operation or act of the operator is necessary to cause termination of sanding when the train comes to a stop.

To effect the release of the brakes prior to again starting the locomotive and cars, the operator merely shifts the brake valve handle 21a to its brake release position. The fluid pressure in the control pipe 16 throughout the train is accordingly reduced to atmospheric pressure and the relay valve devices 27 on the locomotive and cars are operated to vent fluid under pressure from the corresponding brake cylinders 14 to effect the complete release of the brakes on the locomotive and cars. Each of the pressure switches 35L, 35C, 36 and 37 is thus automatically restored to its open position. The restoration of the pressure switches 35L and 35C to their open position interrupts the self-holding circuits respectively established by the relays 56L and 56C and these relays are accordingly restored to their dropped-out position.

It will be understood, without further description, that if the locomotive and cars are traveling in a reverse direction, the contact member $i$ of the reversing relay 51 is actuated to the position opposite to that in which it is shown. Accordingly, whenever the contact $d$ of the master sanding relays 56L and 56C is actuated to its picked-up or closed position in response to the operation of the sanding relays 48, the electromagnet windings of the reverse direction sanding magnet valves 42r are energized instead of the windings of the forward direction sanding magnet valves 42f. Consequently, fluid under pressure is supplied from the corresponding sanding reservoirs 41 to the sanding devices 39r to effect sanding of the rails in advance of the wheels for the reverse direction of travel. Since the operation of the equipment is in other respects the same as previously described it is deemed unnecessary to further describe the operation of the equipment for travel of the locomotive and cars in a reverse direction.

Let it now be supposed that having shifted the brake valve handle 21a to its brake release position so that the brakes on the train are released, the operator operates a suitable power controller (not shown) to supply power to the propulsion motors or engines of the locomotive and that due to poor traction or adhesion between the wheels and the rails, the driver wheels on the locomotive commence to race. In order to improve the adhesion between the wheels and the rails and thus to prevent the racing of the driver wheels on the locomotive, the operator operates the push button switch 63 on the locomotive to its closed position to effect sanding in the advance of the driver wheels on the locomotive only.

Due to the face that the operating windings $a$ of the master sanding relay 56L on the locomotive is connected directly across the train wires 58 and 59, the closure of the switch 63 effects instantaneous energization thereof and the consequent pick-up of the contact members $c$ and $d$ thereof.

Since the pressure switch 35L is in open position, the brakes being released, it will be apparent that the actuation of the self-holding front contact $c$ of master sanding relay 56L to its closed position is not effective to cause energization of the winding $b$ of the relay. Consequently, whenever the switch 63 is restored to its open position and the operating winding $a$ of the relay 56L again deenergized, the contact $d$ of the sanding relay is instantly restored to its open position to effect deenergization of the sanding magnet valves 42f or 42r.

It will thus be apparent that the operator may effect sanding on the locomotive for any desired length of time by holding the switch 63 closed for such time. Obviously, if the length of time is greater than the blow-down time of the sanding reservoirs 41, it will be necessary for the operator to open the switch 63 momentarily so as to effect recharging of the sanding reservoirs. He may then reclose the switch 63 and thus continue the sanding for a longer interval of time.

With the brakes released, and the pressure in the control pipe 16 correspondingly at atmospheric pressure, the pressure switch 35C on each of the cars is in its open position in which the contact member $a$ thereof interrupts the connection of the operating winding $a$ of the master sanding relay 56C across the train wires 58 and 59. It will thus be seen that with the brakes released, the closing of the switch 63 on the locomotive is not effective to cause pick-up of the master sanding relays 56C on the cars but is effective to cause pick-up of the master sanding relay 56L only on the locomotive. Thus, sanding is not effected on the cars in response to the operation of the switch 63 to its closed position, while the brakes are released, but only on the locomotive.

If the brakes on the locomotive and cars are applied and the pressure switches 35L and 35C are correspondingly in closed position and the operator desires to effect sanding at any time on the locomotive and cars, he operates the pressure switch 63 to its closed position. The operating windings $a$ of the master sanding relay 56L on the locomotive is of course energized as previously described and, at the same time, due to the fact that the contact member $a$ of each of the pressure switches 35C on the cars is in closed position, the operating winding $a$ of the master sanding relay 56C on the several cars is also energized and the contact members of the relay are actuated to their picked-up position.

Since the pressure switches 35L and 35C are in closed position, however, the actuation of the contact member $c$ of the master sanding relays 56L and 56C to its picked-up or closed position establishes a self-holding circuit for energizing the winding $b$ of these relays to maintain the relay picked-up thereafter notwithstanding the subsequent opening of the switch 63. These self-holding circuits for the operating windings of the relays 56L and 56C have been previously described. Accordingly, it will be understood that upon the closure of switch 63 by the operator while the brakes are applied, sanding is effected on both the locomotive and the cars for a predetermined time notwithstanding the fact that the operator immediately opens the switch 63, unless he also operates the brake valve 21 to effect the release of the brakes and the consequent opening of the pressure switches 35L and 35C to effect the drop-out of the master sanding relays.

*Summary*

Summarizing, it will be seen that I have disclosed a brake and sanding control equipment for a train of cars in which sanding in advance of the wheels is effected automatically whenever the wheels rotatively decelerate at a rate exceeding a certain non-slipping rate, such as four miles per hour per second, and in which the brakes associated with a limited number of wheels, such as the wheels of a wheel truck, are automatically released when a wheel or wheels of that truck begins to slip and rotatively decelerate at a rate exceeding a rate such as ten miles per hour per second.

At the same time, I have provided an arrangement whereby the operator of the train stationed on one car, such as the locomotive, may effect sanding in advance of the wheels on the locomotive only, at any time he so desires, by the operation of an electrical switch, the duration of sanding time corresponding to the time that the switch remains closed.

If the operator desires to effect sanding on both the locomotive and cars at any time during an application of the brakes, he may do so by operating the said electrical switch. In such case sanding is continued for a predetermined time and then terminated automatically unless the brakes are sooner released, in which case the sanding is terminated in a shorter time than the predetermined time.

While I have disclosed only one specific embodiment of my invention, it will be apparent that various omissions, additions, or modifications may be made therein without departing from the spirit of my invention. It is accordingly not my intention to limit the scope of my invention except in accordance with the terms of the appended claims.

Having now described my invention, what I claim as new and desire to secure by Letters Patent, is:

1. Sanding control apparatus for a wheeled vehicle comprising, in combination, a relay having a plurality of separate operating windings any one of which is effective when energized to cause actuation of the relay from a normal position to an operated position, means controlled by said relay and operative to cause sanding of the track rails or road surface in advance of the vehicle wheels when the relay is actuated to its operated position, means operatively responsive to the rotative deceleration of a vehicle wheel at a rate exceeding a certain rate for effecting energization of one of the windings of said relay, and manually operated means for effecting energization of another of the windings of said relay.

2. Sanding control apparatus for a wheeled vehicle comprising, in combination, a relay having a plurality of separate windings any one of which is effective when energized to cause actuation of the relay from a normal position to an operated position, a switch device operative to one position upon the rotation of a vehicle wheel in one direction and operative to a different position upon rotation of the vehicle wheel in the opposite direction, sanding means operative to cause sanding in advance of the vehicle wheels while rotating in said one direction, sanding means operative to cause sanding in advance of the vehicle wheels while rotating in the opposite direction, said relay and said switch device being jointly effective to selectively cause operation of the one or the other of said sanding means in accordance with the direction of rotation of said wheels, means operatively responsive to the rotative deceleration of a vehicle wheel at a rate exceeding a certain rate for effecting energization of one of the windings of said relay, and manually operated means for effecting energization of another of the windings of said relay.

3. Sanding control apparatus for a wheeled vehicle comprising, in combination, a relay having a plurality of separate windings any one of which is effective when energized to cause actuation of the relay from a normal position to an operated position, a switch device, means controlled in accordance with the direction of rotation of a vehicle wheel for causing the switch device to be operated to either of two positions in accordance with the direction of travel of the vehicle, magnet valve means under the joint control of said relay and said switch device while in one position thereof and operative to cause sanding in advance of the vehicle wheels when the vehicle is traveling in a forward direction, other magnet valve means under the joint control of said relay and said switch device while in the other of its positions and operative to effect sanding in advance of the vehicle wheels when the vehicle is traveling in the reverse direction, means operatively responsive to the rotative deceleration of a vehicle wheel at a rate exceeding a certain rate for effecting energization of one of the windings of said relay, and manually operated means for effecting energization of another of the windings of said relay at any time.

4. Brake and sanding control apparatus for a wheeled vehicle comprising, in combination, means for effecting application and release of the brakes associated with the vehicle wheels, sanding means for effecting sanding in advance of the vehicle wheels, an electrical relay having two separate operating windings and effective upon energization of either of said windings for causing operation of said sanding means, means operative in response to the rotative deceleration of a wheel of the vehicle at a rate in excess of a certain rate for effecting energization of one of the windings of said relay, means controlled in accordance with the degree of application of the brakes for preventing energization of said one winding by the last said means unless the degree of application of the brakes exceeds a certain degree, and manually operated means for effecting energization of the other of said windings at any time.

5. Brake and sanding control apparatus for a wheeled vehicle comprising, in combination, means for effecting application and release of the brakes associated with the vehicle wheels, sanding means operative to effect sanding in advance of the vehicle wheels, a relay having a plurality of separate operating windings any one of which is effective when energized to cause operation of said relay resulting in the operation of said sanding means, means operatively responsive to the rotative deceleration of a vehicle wheel at a rate exceeding a certain rate for effecting energization of one of the windings of said relay, manually operative means for effecting energization of another of the windings of said relay, and means controlled in accordance with the degree of application of the brakes for preventing energization of either of said windings unless the application of the brakes exceeds a certain degree.

6. Brake and sanding control apparatus for a wheeled vehicle comprising, in combination, means for effecting application of the brakes associated with the vehicle wheels, sanding means operative to effect sanding in advance of the vehicle wheels, an electrical relay having a plurality of separate operating windings any one of which is effective when energized to cause actuation of the relay resulting in operation of said sanding means, said relay having a contact member effective upon energization of one of the windings of said relay, to establish a self-holding circuit to thereafter maintain said one winding energized, and means controlled in accordance with the degree of application of the brakes effective to cause interruption of said self-holding circuit and the deenergization of said one winding upon a reduction in the degree of application of the brakes below a certain degree.

7. Brake and sanding control apparatus for a wheeled vehicle comprising, in combination, means for effecting application of the brakes associated with the wheels of the vehicle, sanding means operative to effect sanding in advance of the wheels of the vehicle, an electrical relay having a plurality of separate operating windings any one of which is effective when energized to cause pick-up of the relay, said relay being effective in its pick-up position to cause operation of the sanding means to cause sanding, means operatively responsive to the rotative deceleration of a wheel of the vehicle at a rate exceeding a certain rate for effecting energization of one of the windings of said relay, means effective upon energization of the said one winding of the relay for thereafter causing said one winding to be maintained energized independently of the last said means, manually operable means for effecting energization of another of the windings of said relay at any time and for a desired length of time, and means effective to cause said sanding means to terminate sanding in a certain limited time notwithstanding the continued energization of any of the windings of the said relay for a time in excess of said predetermined time.

8. Brake and sanding control apparatus for a wheeled vehicle comprising, in combination, means for effecting application of the brakes associated with the wheels of the vehicle, sanding means operative to effect sanding in advance of the wheels of the vehicle, an electrical relay having a plurality of separate operating windings any one of which is effective when energized to cause pick-up of the relay, said relay being effective in its picked-up position to cause operation of the sanding means to cause sanding, means operatively responsive to the rotative deceleration of a wheel of the vehicle at a rate exceeding a certain rate for effecting energization of one of the windings of said relay, means effective upon energization of the said one winding of the relay for thereafter causing said one winding to be maintained energized independently of the last said means, manually operable means for effecting energization of another of the windings of said relay at any time and for a desired length of time, means effective to cause said sanding means to terminate sanding in a certain limited time notwithstanding the continued energization of any of the windings of the said relay for a time in excess of said predetermined time, and means controlled in accordance with the degree of application of the brakes for effecting deenergization of the said one winding of the relay whenever the application of the brakes is reduced below a certain degree.

9. A brake and sanding control apparatus for a train including a locomotive and one or more cars comprising, in combination, means for effecting application and release of the brakes associated with the wheels on the locomotive and cars, sanding means on the locomotive operative to effect sanding in advance of the wheels on the locomotive, sanding means on each of the cars operative to effect sanding in advance of the wheels on the car, an electrical relay on the locomotive having an operating winding effective when energized to cause pick-up of the relay resulting in operation of the sanding means on the locomotive to cause sanding, an electrical relay on each of the cars having an operating winding effective when energized to cause pick-up of the relay resulting in operation of the sanding means on the corresponding car, manually operative means on the locomotive operative to effect energization of the operating winding of the relay on the locomotive and on each of the cars, and means on each of the cars controlled according to the degree of application of the brakes on the cars for preventing energization of the operating winding of the relay on the corresponding car unless the application of the brakes thereon exceeds a certain value.

10. Brake and sanding control apparatus for a train including a locomotive and one or more cars comprising, in combination, means on the locomotive for establishing a control fluid pressure on the locomotive and cars varying in degree according to a desired degree of application of the brakes associated with the wheels on the locomotive and cars, means on the locomotive operative to effect application of the brakes on the locomotive in accordance with the control fluid pressure established thereon, means on each of the cars operative to effect application of the brakes in accordance with the control fluid pressure established thereon, sanding means on the locomotive operative to cause sanding in advance of the wheels of the locomotive sanding means on each of the cars operative to cause sanding in advance of the wheels on the corresponding car, a normally open circuit, including a source of voltage, extending through the locomotive and cars, a manually operable switch adapted to close said circuit, an electrical relay on the locomotive having an operating winding connected in said circuit and energized whenever and as long as said switch closes said circuit, said relay being effective when the operating winding thereof is energized to cause operation of the sanding means on the locomotive to cause sanding, and an electrical relay on each of the cars having an operating winding operating on said circuit, means for preventing energization of the operating winding of the relay on each of the cars notwithstanding the operation of said switch to close said circuit as long as the brakes on the cars are released and effective to cause energization of the operating winding of the relay on each of the cars in response to operation of said switch to close said circuit only during an application of the brakes exceeding a certain degree, said relay on each of the cars being effective when the operating winding thereof is energized to cause operation of the sanding means on the corresponding car to cause sanding.

11. Brake and sanding control apparatus for a train including a locomotive and one or more cars of the type having means on the locomotive for controlling the application and release of the brakes associated with the wheels of the locomotive and cars, comprising, in combination, sanding means on the locomotive operative to effect sanding in advance of the wheels on the locomotive, sanding means on each of the cars operative to cause sanding in advance of the wheels on the corresponding car, manually operable means on the locomotive effective upon operation to cause operation of the sanding means simultaneously on the locomotive and on the cars, and means for preventing operation of the sanding means on the cars but not on the locomotive in response to the operation of the last said means, as long as the brakes on the locomotive and cars are released.

12. Sanding control apparatus for a train including a locomotive and one or more cars comprising, in combination, sanding means on the locomotive operative to cause sanding in advance of the wheels on the locomotive, sanding means on each of the cars operative to cause sanding in advance of the wheels on the corresponding car, an electrical relay on the locomotive having a plurality of windings any one of which is effective when energized to cause pick-up of the relay resulting in operation of the sanding means on the locomotive to cause sanding, an electrical relay on each of the cars having a plurality of windings any one of which is effective when energized to cause pick-up of the relay resulting in operation of the sanding means on the car to cause sanding, means operatively responsive to the rotative deceleration of a wheel on a locomotive at a rate exceeding a certain rate for effecting energization of one winding of the relay on the locomotive, means operatively responsive to the rotative deceleration of a wheel on each of the cars at a rate exceeding a certain rate for effecting energization of one winding of the relay on the corresponding car, and means on the locomotive for controlling the energization of another of the windings of the relay on the locomotive and another of the windings of the relay on each of the cars.

13. Brake and sanding control apparatus for a train including a locomotive and one or more cars, of the type having means on the locomotive for controlling the application and release of the brakes on the locomotive and cars comprising, in combination, sanding means on the locomotive operative to cause sanding in advance of the wheels of the locomotive, sanding means on each of the cars operative to cause sanding in advance of the wheels of the corresponding car, an electrical relay on the locomotive having a plurality of operating windings any one of which is effective when energized to cause pick-up of the relay resulting in the operation of the sanding means on the locomotive, an electrical relay on each of the cars having a plurality of windings any one of which is effective when energized to cause pick-up of the relay resulting in operation of the sanding means on the corresponding car, means operatively responsive to the rotative deceleration of a wheel on the locomotive at a rate exceeding a certain rate, means controlled in accordance with the degree of application of the brakes on the locomotive effective jointly with the last said means to control energization of one winding of the said relay on the locomotive, means operatively responsive to the rotative deceleration of a wheel on each car at a rate exceeding a certain rate, means on each car controlled in accordance with the degree of application of the brakes on the corresponding car effective jointly with the last said means for controlling one of the windings of the relay on the corresponding car, manually operative means on the locomotive effective in itself to control the energization of another of the windings of the relay on the locomotive, and means on each of the cars controlled in accordance with the degree of application of the brakes on the car and effective jointly with the manually operative means on the locomotive for controlling another of the windings of the relay on the corresponding car.

14. Sanding control apparatus for a wheeled vehicle having brakes for exerting a braking effect on the vehicle, comprising a single manually operative element having a normal position and operative to a different position, means responsive to operation of said element to its different position while the brakes are released for effecting sanding only so long as said element is in its different position, and means effective in response to operation of said element to its different position while the brakes are applied for effecting continuous sanding for a certain uniform length of time notwithstanding the restoration of said element to its normal position prior to the expiration of said certain length of time.

15. Sanding control apparatus for a wheeled vehicle having brakes for exerting a braking effect on the vehicle, comprising a single manually operative element having a normal position and operative to a different position, means operative to one or the other of two different positions depending upon whether the brakes are released or applied on the vehicle, means controlled solely by said element and effective in response to operation of said element to its said different position for effecting sanding only while said element is in its different position, and means controlled jointly by said element and said brake responsive means and operative in response to the operation of said element to its different position while the brakes are applied for causing continuous sanding for a certain uniform length of time notwithstanding the restoration of said element to its normal position prior to the expiration of said certain length of time.

16. Sanding control apparatus for a wheeled vehicle having brakes for exerting a braking effect on the vehicle, comprising in combination, an electrical relay having a plurality of separate windings energization of any of which is effective to cause operation of the relay from a normal to an operated position, a manually operative switch having a normally open position and operative to a closed position to effect energization of one winding of said relay, means responsive to the application of the brakes on the vehicle, means effective upon operation of the relay to its operated position and jointly effective with said brake application responsive means when the brakes are applied for effecting energization of another winding of said relay notwithstanding restoration of the switch device to its open position, and means controlled by said relay for effecting sanding for no longer than a certain uniform limited time while said relay remains in its operated position.

17. Brake and sanding control apparatus for a wheeled vehicle comprising, in combination, means under the control of the operator of the vehicle for establishing a control fluid pressure varying in degree according to a desired degree of application of the brakes associated with the wheels of the vehicle, pressure-responsive means subject to the control pressure and actuated to an operated position from a normal position whenever the control pressure exceeds a certain pressure, an electrical relay having a plurality of windings energization of any of which is effective to cause actuation of the relay from a dropped-out to a picked-up position, a manually operative switch device having a normally open position and operative to a closed position for effecting energization of one of the windings of said relay, means effective in response to operation of the relay to its picked-up position while the said pressure-responsive means is in its operated position for establishing and maintaining a circuit for energizing another winding of said relay, means controlled by said relay and effective to cause sanding while said relay remains picked-up, and means for limiting the duration of continuous sanding to a certain uniform time notwithstanding the continued pick-up of said relay.

18. Sanding control apparatus for a train having a propulsion car and one or more trailing cars, the train being provided with brake control apparatus for applying and releasing the brakes on all cars of the train, said sanding control apparatus comprising in combination, a train wire extending from car to car throughout the train, a manually operative device on the propulsion car for energizing said wire, an electrical relay on the propulsion car operating on said wire and effective, whenever said wire is energized, to cause sanding on the propulsion car, an electrical relay on each of the trailing cars operating on said wire, means effective when the brakes on the train are released for preventing operation of the said relays on the trailing cars in response to energization of said wire as long as the brakes are released, and effective to cause operation of the relays on the trailing cars in response to energization of the wire when the brakes on the train are applied, the relay on each of the cars being effective when operated in response to energization of the wire for effecting sanding on the corresponding car.

19. Sanding control apparatus for a train having a propulsion car and one or more trailing cars and provided with a brake control apparatus whereby the brakes are applied and released on the cars under the control of the operator of the train, said sanding control apparatus comprising a pair of train wires extending from car to car throughout the train, a source of voltage, a manually operated switch device having a normally open position and operative to a closed position to impress the voltage from said source on said pair of train wires, an electrical relay having an operating winding adapted to be energized to cause pick-up of the relay whenever the voltage of said source is impressed across said pair of wires, means on the propulsion car controlled by said relay for effecting sanding on the propulsion car when the said relay is picked-up, an electrical relay on each of the trailing cars, each of said relays having an operating winding effective when energized to cause pick-up of the relay, means on each of the trailing cars responsive to application and release of the brakes on the cars for preventing energization of the winding of the relay on the corresponding car in response to the impression of the voltage on said pair of train wires except during the application of the brakes, and means on each car controlled by the relay on the corresponding car for effecting sanding on the car when said relay is picked-up.

ANDREW J. SORENSEN.